US008351938B1

(12) United States Patent
Shetty et al.

(10) Patent No.: US 8,351,938 B1
(45) Date of Patent: Jan. 8, 2013

(54) SYSTEM AND METHOD FOR DYNAMIC ROUTE-UPDATE-RADIUS PARAMETERS

(75) Inventors: Manoj Shetty, Overland Park, KS (US); Bhagwan Khanka, Lenexa, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 334 days.

(21) Appl. No.: 12/757,377

(22) Filed: Apr. 9, 2010

(51) Int. Cl.
*H04L 12/26* (2006.01)

(52) U.S. Cl. ............... 455/435.1; 370/237; 370/235; 455/432.1; 455/456.1

(58) Field of Classification Search .................. None
See application file for complete search history.

(56) References Cited

U.S. PATENT DOCUMENTS

| | | | |
|---|---|---|---|
| 5,175,758 A | 12/1992 | Levanto et al. | |
| 5,701,337 A | 12/1997 | Silver et al. | |
| 5,802,469 A | 9/1998 | Nounin et al. | |
| 5,828,949 A | 10/1998 | Silver et al. | |
| 7,990,921 B1 | 8/2011 | Sarkar et al. | |
| 2005/0186961 A1* | 8/2005 | Aikawa et al. | 455/435.1 |
| 2005/0213590 A1 | 9/2005 | Hauenstein et al. | |
| 2006/0199596 A1* | 9/2006 | Teauge et al. | 455/458 |
| 2007/0249329 A1 | 10/2007 | Zou | |
| 2008/0032713 A1 | 2/2008 | Yang | |
| 2008/0207227 A1 | 8/2008 | Ren et al. | |
| 2009/0116391 A1 | 5/2009 | Bakker et al. | |
| 2009/0129307 A1 | 5/2009 | Akhtar et al. | |
| 2009/0201842 A1 | 8/2009 | Guan | |
| 2009/0219888 A1 | 9/2009 | Chen et al. | |
| 2009/0264134 A1 | 10/2009 | Xu et al. | |
| 2009/0323530 A1* | 12/2009 | Trigui et al. | 370/235 |
| 2010/0017578 A1 | 1/2010 | Mansson et al. | |
| 2010/0222074 A1* | 9/2010 | Ramachandran et al. | . 455/456.1 |
| 2011/0263242 A1 | 10/2011 | Tinnakornsrisuphap et al. | |
| 2012/0094666 A1 | 4/2012 | Awoniyi et al. | |

OTHER PUBLICATIONS

3rd Generation Partnership Project 2 "3GPP2", cdma2000 High Rate Packet Data Air Interface Specification, Version 3.0, Sep. 2006.
Dai Libin, Building a Mobile IP RAN Transport Network, Solution, Version 33, Aug. 2007.
Charan Langton, Intuitive Guide to Principles of Communications, Code Division Multiple Access (CDMA), The Concept of Signal Spreading and its uses in communications, 2002.
3G Wireless Radio Network Controller, AdvancedTCA* Line Cards for 3G Networks, Aug. 29, 2002.
U.S. Appl. No. 12/757,471, filed Apr. 9, 2010 and entitled "System and method for dynamic route-update radius parameters."

* cited by examiner

*Primary Examiner* — Nimesh Patel
*Assistant Examiner* — Daniel Nobile

(57) ABSTRACT

System and methods for generating and transmitting dynamic route-update-radius parameters are described. The parameters are dynamic in that the parameters may be modified from time-to-time. Modification of the parameters may be triggered by a radio access network (RAN) determining that a coverage area formed by the RAN is handling more than a threshold amount of communications to and/or from access terminals operating in the coverage area. The RAN may transmit the dynamic route-update-radius parameters so as to prevent some access terminals from registering with the coverage area while the coverage area is handling more than the threshold amount of communications. While the coverage area is handling a reduced amount of communications, such as less than a threshold amount of communications, the access network may transmit default route-update-radius parameters to coverage areas remote from that coverage area. The route-update-radius parameters may include a route-update-radius, a modified route-update-radius, and a route-update-radius offset.

19 Claims, 7 Drawing Sheets

38

| Coverage Area Identifier | Route-Update-Radius Parameters ||| 
|---|---|---|---|
| | Route-Update-Radius | Modified Route-Update-Radius | Route-Update-Radius-Offset |
| A | 10 | 8 | -2 |
| B | 9 | 8 | -1 |
| C | 10 | 12 | 2 |
| D | 7 | 4 | -3 |
| E | 12 | 11 | -1 |
| F | 10 | 7 | -3 |
| G | 12 | None | 0 |
| H | 8 | 10 | 2 |
| I | 13 | 12 | -1 |
| J | 12 | 9 | -3 |
| K | 12 | 13 | 1 |
| L | 10 | None | 0 |
| M | 9 | 11 | 2 |
| N | 8 | 10 | 2 |
| O | 10 | 9 | -1 |

FIG. 4

SYSTEM AND METHOD FOR DYNAMIC ROUTE-UPDATE-RADIUS PARAMETERS

REFERENCE TO RELATED APPLICATION

This application is being filed on the same date as U.S. patent application Ser. No. 12/757,471, which is hereby incorporated by reference in its entirety, and is entitled system and method for adaptive route updating for access terminals based on mobility and channel loading.

BACKGROUND

Access terminals, such as cell phones and wireless personal digital assistants (PDAs), are operable to communicate with radio access networks, such as cellular wireless networks. These access terminals and access networks typically communicate with each other over a radio frequency (RF) air interface according to a wireless protocol such as 1× Evolution Data Optimized (1× Ev-DO), perhaps in conformance with one or more industry specifications such as IS-856, Revision 0, IS-856, Revision A, and IS-856, Revision B. Other wireless protocols may be used as well, such as Code Division Multiple Access (CDMA), Global System for Mobile Communications (GSM), Time Division Multiple Access (TDMA), or some other wireless protocol.

Access networks typically provide services such as voice, text messaging (such as Short Message Service (SMS) messaging), and packet-data communication, among others. Access networks typically include a plurality of base transceiver stations (BTSs), each of which provides one or more coverage areas, such as cells and sectors (i.e., individual areas of a cell that allow the cell to carry more calls). When an access terminal is positioned in one of these coverage areas, it can communicate over the air interface with the BTS, and in turn over a signaling network or a transport network, or both. The signaling network may be a circuit-switched network, a packet-switched network or a combination of both. Similarly, the transport network may be a circuit-switched network, a packet-switched network or a combination of both.

Access terminals and access networks may conduct communication sessions (e.g. voice calls and data sessions) over a pair of frequencies known as carriers, with a BTS of an access network transmitting to an access terminal on one of the frequencies, and the access terminal transmitting to the BTS on the other. This is known as frequency division duplex (FDD). A BTS-to-access-terminal communication link is known as the forward-link, while an access-terminal-to-BTS communication link is known as the reverse-link.

Access terminals may be mobile such that the access terminals can be transported between different coverage areas while the access terminals are operating in an idle mode (e.g., a mode in which the access terminals are not carrying out communication sessions) or an active mode (e.g., a mode in which the access terminals are carrying out communication sessions). A given coverage area provided by an access network may reach a capacity for carrying out communications if too many access terminals are carrying out and/or are trying to carry out communications while in the given coverage area. An access network may be arranged to compensate for coverage areas operating at their capacity.

OVERVIEW

An access network may use a route update protocol that provides procedures and messages to keep track of an access terminal's approximate location and to maintain a radio communication link as the access terminal moves between the coverage areas provided by the base transceiver stations (BTSs) of the access network. Each of these BTSs may transmit overhead messages to the access terminals being served by the BTS. The overhead messages may include various parameters such as the latitude of the BTS, the longitude of the BTS, a route-update-radius parameter, and others. The route-update-radius parameter transmitted to a given access terminal may indicate a distance between the BTS currently serving the given access terminal and the BTS that provides the coverage area in which the given access terminal last reported its location. The example embodiments described hereinafter are directed to systems and method for dynamic route-update-radius parameters that allow access networks to compensate for coverage areas that are operating at or above their capacity.

In one respect, an example embodiment may take the form of a method that includes (i) an access network maintaining a respective route-update-radius parameter for each coverage area of a plurality of coverage areas defined by the access network, (ii) the access network determining that a first coverage area of the plurality of coverage areas is handling an amount of communications at or above a threshold parameter, (iii) the access network identifying a second coverage area of the plurality of coverage areas by determining that a sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area, and (iv) in response to identifying the second coverage area, the access network generating a modified route-update-radius parameter for the second coverage area and transmitting the modified route-update-radius parameter for the second coverage area within the second coverage area.

In another respect, an example embodiment may take the form of a system of a radio access network that defines a plurality of coverage areas. The system comprises (i) a computer-readable data storage device that contains computer-readable program instructions and a respective route-update-radius parameter for each coverage area of the plurality of coverage areas defined by the radio access network, (ii) a processor, and (iii) a plurality of base transceiver stations. Each base transceiver station is operable to transmit and receive communications within at least one coverage area of the plurality of coverage areas.

The computer-readable program instructions of the foregoing example embodiment may comprise instructions that are executable by the processor to (i) determine that a first coverage area of the plurality of coverage areas is handling an amount of communications at or above a threshold parameter, (ii) identify a second coverage area of the plurality of coverage areas via a determination that a sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area, and (iii) generate a modified route-update-radius parameter for the second coverage area. A base transceiver station of the plurality of base transceiver stations transmits the modified route-update-radius parameter for the second coverage area within the second coverage area.

In yet another respect, an example embodiment may take the foiui of a radio access network controller of a radio access network that defines a plurality of coverage areas. The radio network controller comprises (i) a processor, (ii) a computer-readable data storage device that contains computer-readable program instructions and a respective route-update-radius parameter for each coverage area of the plurality of coverage areas defined by the radio access network, and (iii) an interface that communicatively couples the radio network controller to one or more base transceiver stations. Each base transceiver station is operable to transmit and receive communications within at least one coverage area of the plurality of coverage areas.

The computer-readable program instructions of the foregoing example embodiment may comprise instructions that are executable by the processor to (i) determine that a first coverage area of the plurality of coverage areas is handling an amount of communications at or above a threshold parameter, (ii) identify a second coverage area of the plurality of coverage areas via a determination that a sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area, (iii) generate a modified route-update-radius parameter for the second coverage area, and (iv) cause the modified route-update-radius parameter for the second coverage area to be transmitted via the communications interface to a base transceiver station within the second coverage area.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which:

FIG. 4 illustrates example route-update-radius parameters; and

DETAILED DESCRIPTION

I. Introduction

The present description describes example systems and methods for dynamic route-update-radius parameters. These parameters may be broadcast (e.g., transmitted) to access terminals operating within coverage areas (e.g., cells or sectors) defined by an access network that determines the parameters and/or contains a device for determining the parameters. Upon receiving the dynamic route-update-radius parameters, the access terminals may begin using the parameters so as to prevent some access terminals operating in a coverage area that received the dynamic route-update-radius parameters from registering with a given coverage area that is handling more than a threshold amount of communications. This prevention may result from those access terminals registering with another coverage area instead of the given coverage area or by delaying registering with the given coverage area. As the amount of communications being handled by the given coverage area is reduced, the access network may revert back to previously-used route-update-radius parameters and send the previously-used route-update parameters within the coverage areas that received the dynamic route-update-radius parameters.

II. Example Architecture

Figure 1:
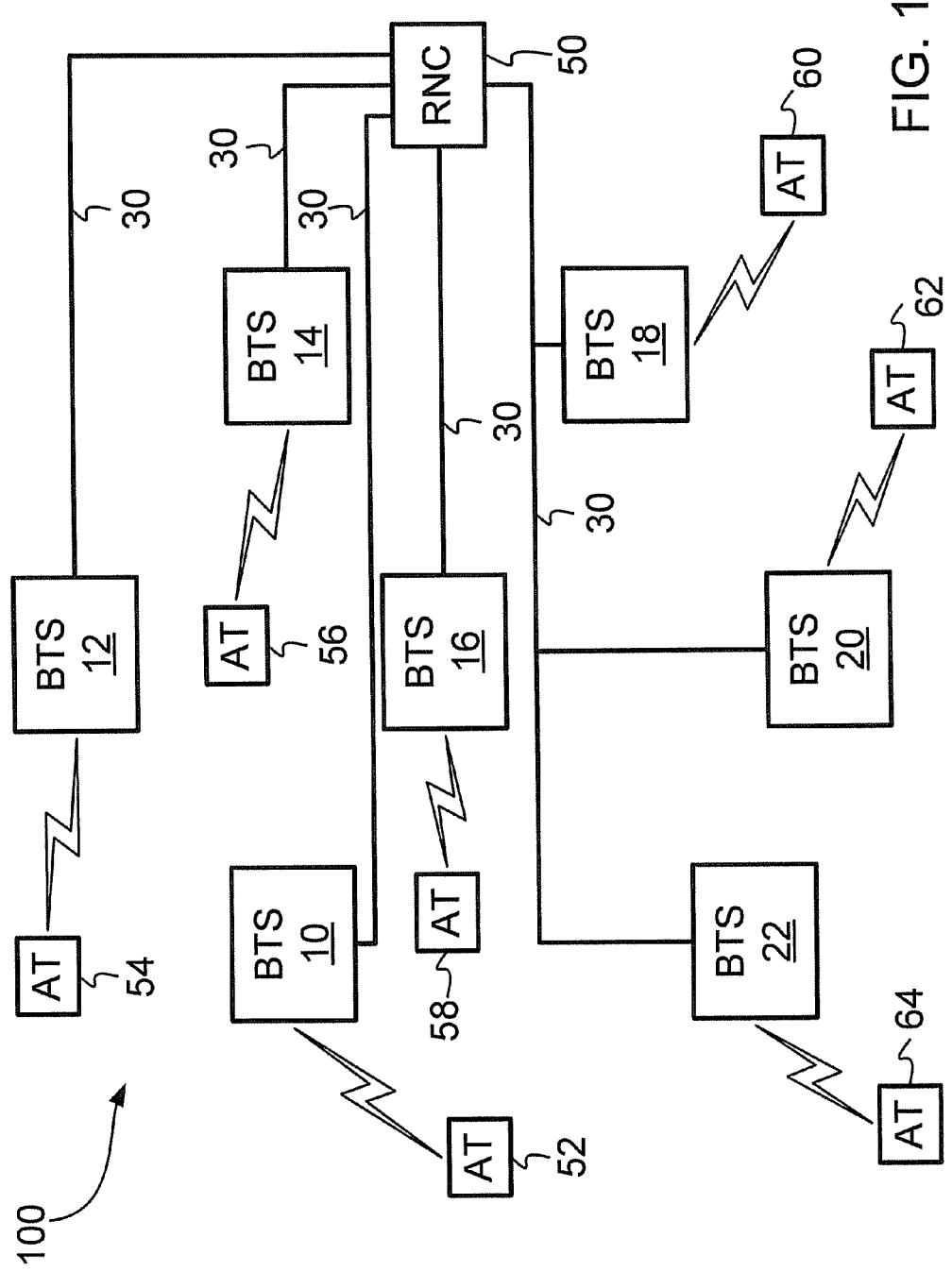
FIG. 1 is a block diagram of an example radio access network and wireless access terminals that are operable in accordance with example embodiments.

FIG. 1 is a block diagram of an example radio access network 100 and wireless access terminals 52, 54, 56, 58, 60, 62, 64 that are operable in accordance with example embodiments. The access terminals may comprise a cell phone, a wireless PDA, a lap-top computer, or some other type of access terminal that wirelessly communicates with access network 100. It should be understood, however, that the block diagram of FIG. 1 and other block diagrams and flow charts are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (e.g., machines, interfaces, functions, orders, and groupings of functions, etc.) can be used instead. Furthermore, various functions described as being performed by one or more elements may be carried out by a processor executing computer-readable program instructions and/or by any combination of hardware, firmware, and software.

Access network 100 includes a radio network controller (RNC) 50, base transceiver stations (BTSs) 10, 12, 14, 16, 18, 20, 22, and communication links 30 (e.g., wireless and/or wired communication links) that communicatively couple RNC 50 to BTSs 10, 12, 14, 16, 18, 20, 22. Each of the BTSs is operable to transmit communications to access terminals and receive communications from access terminals within at least one coverage area of a plurality of coverage areas. Those communications may be carried out according to a wireless protocol, such as 1× Ev-DO or some other wireless protocol. RNC 50 is operable to control each of the BTSs.

Each of the BTSs illustrated in FIG. 1 are shown as communicating with a single access terminal. For example, FIG. 1 illustrates BTS 10 communicating with access terminal 52. A person having ordinary skill in the art will understand that each of the BTSs illustrated in FIG. 1 may communicate with more than one access terminal.

Figure 2:
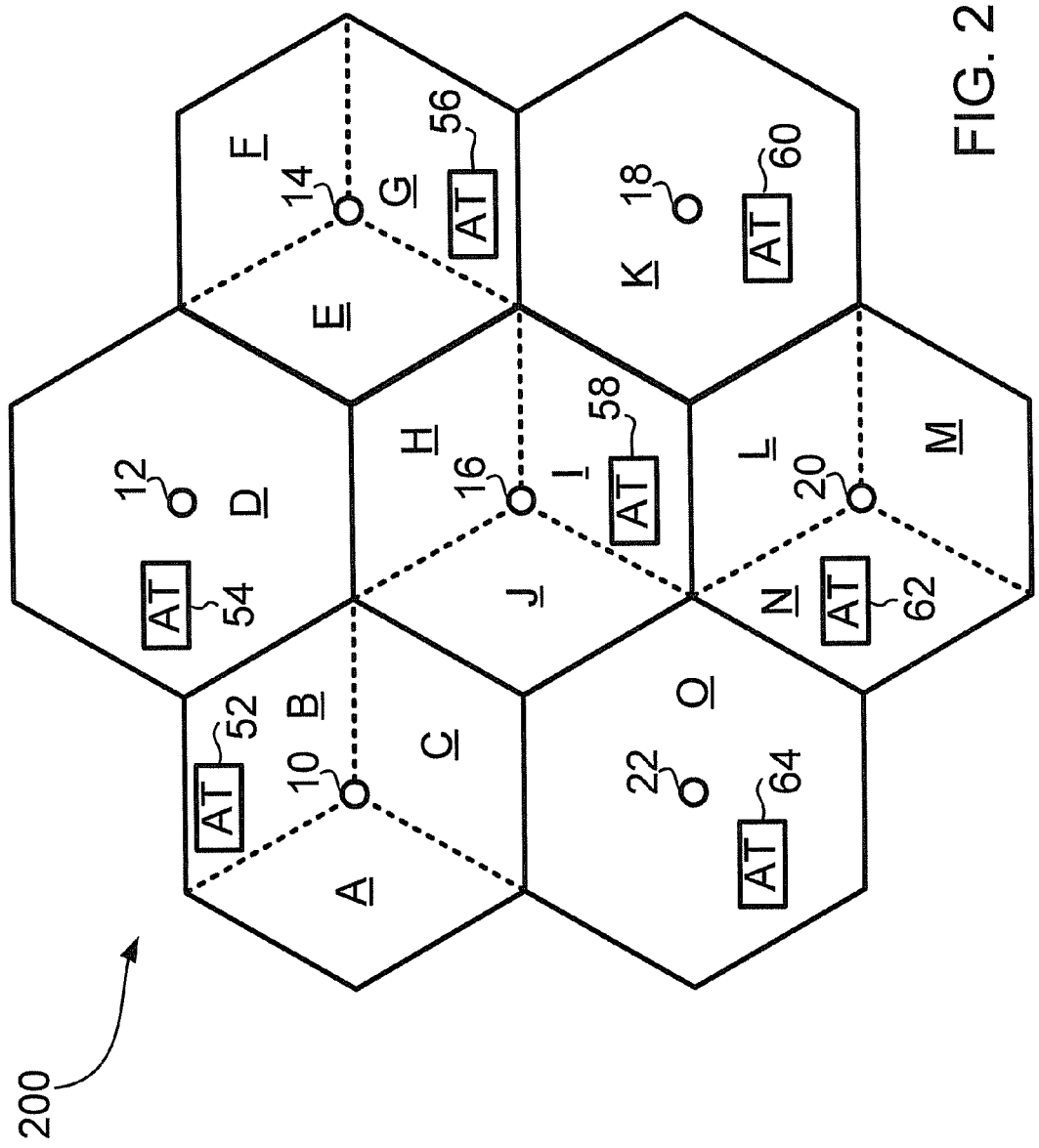
FIG. 2 illustrates a plurality of wireless access coverage areas that is provided by BTSs operating in an example radio access network.

Next, FIG. 2 illustrates a plurality of wireless access coverage areas 200 that is provided by the BTSs operating in access network 100. Each of BTSs 10, 12, 14, 16, 18, 20, 22 provides one or more of the coverage areas illustrated in FIG. 2. For example, BTS 10 provides coverage areas A, B, and C, BTS 12 provides coverage area D, BTS 14 provides coverage areas E, F, and G, BTS 16 provides coverage areas H, I, and J, BTS 18 provides coverage area K, BTS 20 provides coverage areas L, M, and N, and BTS 22 provides coverage area O.

Access terminals may register with a BTS. In particular, the access terminals may register with a cell formed by a BTS or a sector formed by the BTS. FIG. 2 illustrates a respective coverage area in which access terminals 52, 54, 56, 58, 60, 62, 64 are located and currently registered.

Each BTS may provide multiple communication channels for its coverage area(s). The communication channels may, for example, include (i) forward-link control channels that broadcast overhead messages, such as sector parameters messages, from a BTS to an access terminal, (ii) reverse-link access channels that carry messages from an access terminal to a BTS so as to request initiation of a communication session or to respond to a message directed to the access terminal, and (iii) traffic channels that carry bearer traffic and other traffic from a BTS to an access terminal or from an access terminal to a BTS. Other examples of the communication channels defined by the BTSs and other examples of communications carried out via a control channel, an access channel, or a traffic channel are also possible.

Figure 3:
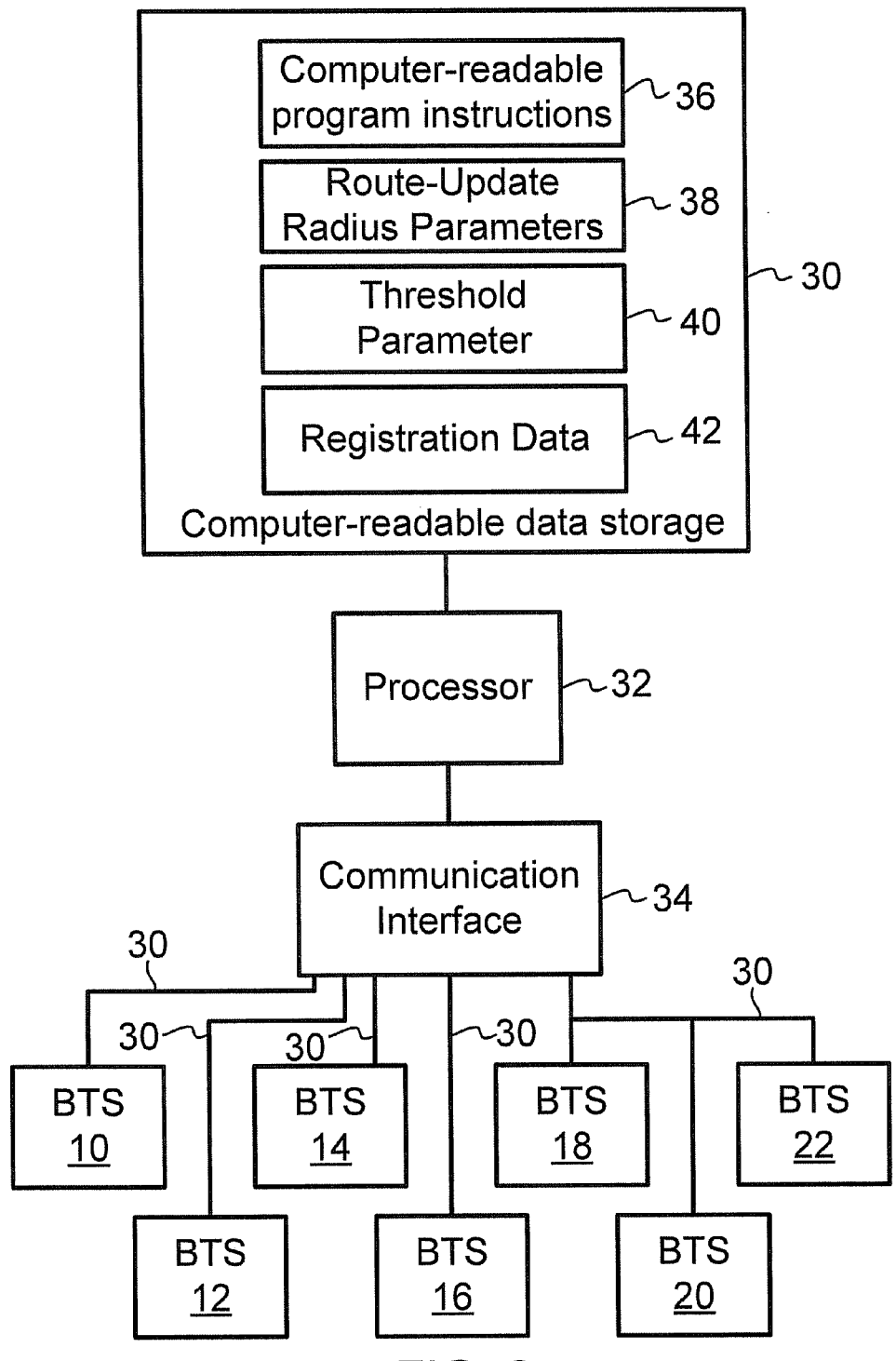
FIG. 3 is a block diagram that illustrates elements for carrying out example embodiments.

Next, FIG. 3 is a block diagram that illustrates elements for carrying out example embodiments. In particular, FIG. 3 illustrates a computer-readable data storage device 30, a processor 32, and a communication interface 34. Communication interface 34 may be communicatively coupled to BTSs 10, 12, 14, 16, 18, 20, 22 via communication links 30.

Processor 32 may comprise one or more general purpose processors (e.g., INTEL microprocessors) and/or one or more special purpose processors (e.g., digital signal processors). Processor 32 may execute computer-readable program instructions 36 that are stored in computer-readable data storage device 30.

Computer-readable data storage device 30 may comprise a computer-readable storage medium readable by processor 32. The computer-readable storage medium may comprise volatile and/or non-volatile storage components, such as optical, magnetic, organic or other memory or disc storage, which can be integrated in whole or in part with processor 32.

Computer-readable program instructions 36 may contain program instructions that are executable by processor 32. Execution of program instructions 36 may cause processor 32, communication interface 34, or some other element of access network 100 to carry out functions of the example embodiments. As an example, program instructions 36 may comprise program instructions executable by processor 32 to determine that a first coverage area (e.g., coverage area B) of the plurality of coverage areas 200 is handling an amount of communications at or above a threshold parameter (e.g., threshold parameter 40).

As another example, program instructions 36 may comprises program instructions executable by processor 32 to identify a second coverage area (e.g., coverage area D) of the plurality of coverage areas 200 by determining that a sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area.

As yet another example, program instructions 36 may comprises program instructions executable by processor 32 to generate a modified route-update-radius parameter for the second coverage area and to cause the modified route-update-radius parameter to be transmitted within the second coverage area. Furthermore, program instructions 36 may comprise program instructions that cause some or all of the functions described below in the example operation section to be carried out by processor 32, computer-readable data storage device 30, communication interface 34, a BTS, or some other element of access network 100.

Data storage device 30 may contain route-update-radius parameters 38. FIG. 4 illustrates an example of route-update-radius parameters 38. As shown in FIG. 4, route-update-radius parameters 38 include for each coverage area of the plurality of coverage areas 200 a route-update-radius, a modified-route-update-radius, and a route-update-radius-offset. The route-update-radius parameters 38 may be associated with any of a variety of distance units, such as kilometers, miles, or some other distance unit. The route-update-radius associated with each coverage area may be a default route-update-radius (e.g., a fixed value). Some of the modified route-update-radii are listed as none. For the coverage areas associated with these radii, the route-update-radius-offset is zero such that a modified route-update-radius equals the route-update-radius for the coverage areas. Each BTS operable within access network 100 may transmit, within a given coverage area provided by the BTS, a route-update-radius parameter that is associated with the given coverage area.

Returning to FIG. 3, data storage device 30 may contain a threshold parameter 40. The threshold parameter may comprise a percentage parameter that processor 32 can use to compare to an amount of communications being carried out in each coverage area of the plurality of coverage areas 200. By way of example, threshold parameter 40 may comprise a parameter that indicates a percentage, such as 75 percent, 80 percent, 85 percent, 90 percent, 95 percent, or some other percent.

Data storage device 30 may contain registration data 42. Table 1 illustrates an example of registration data 42. As shown in Table 1, registration data may include access terminal identifiers, currently-registered coverage area identifiers, and last-registered coverage area identifiers.

TABLE 1

Example Registration Data

| Access Terminal Identifier | Currently-Registered Coverage Area Identifiers | Last-Registered Coverage Area Identifiers |
|---|---|---|
| 52 | B | D |
| 54 | D | F |
| 56 | G | E |
| 58 | I | H |
| 60 | K | G |
| 62 | N | L |
| 64 | O | J |
| 65 | B | D |
| 66 | B | D |
| 67 | B | D |
| 68 | B | C |
| 69 | B | C |

The access terminal identifiers of registration data 42 may be arranged in various configurations. For example, each access terminal identifier may be arranged as a mobile identification number (MIN) associated with an access terminal, an electronic serial number (ESN) associated with an access terminal, or some other number. For purposes of this description, the access terminal identifiers are the reference numbers associated with the access terminals illustrated in FIG. 1 and FIG. 2 and some additional access terminal identifiers 65, 66, 67, 68, 69.

The coverage area identifiers of registration data 42 may comprise various data to identify the currently-registered and last-registered coverage area identifiers. For example, the coverage area identifiers may be arranged as an IP address associated with a coverage area, a serial number associated with a coverage area, or some other number. For purposes of this description, the coverage area identifiers are the reference letters associated with the coverage areas illustrated in FIG. 2.

The elements illustrated in FIG. 3 may be located at various locations within access network 100. For example, computer-readable data storage device 30, processor 32, and communication interface 34 may be located at RNC 50. As another example, one or more of computer-readable data storage device 30, processor 32, and communication interface 34 may be located remote from RNC 50.

III. Example Operation

Figure 5:
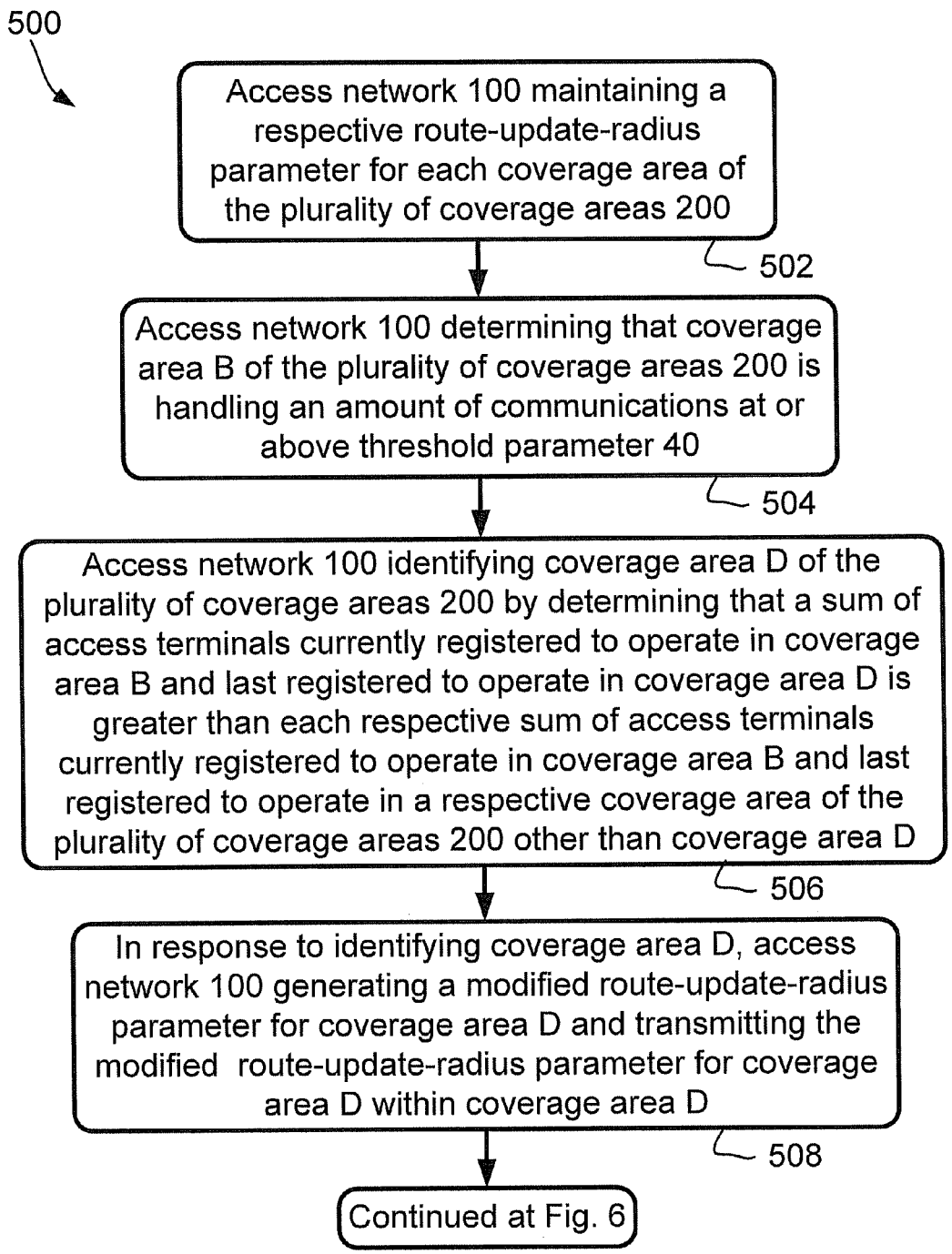
FIG. 5, FIG. 6, and FIG. 7 is a flow chart depicting a set of functions that may be carried out in accordance with an example embodiment.
Figure 6:
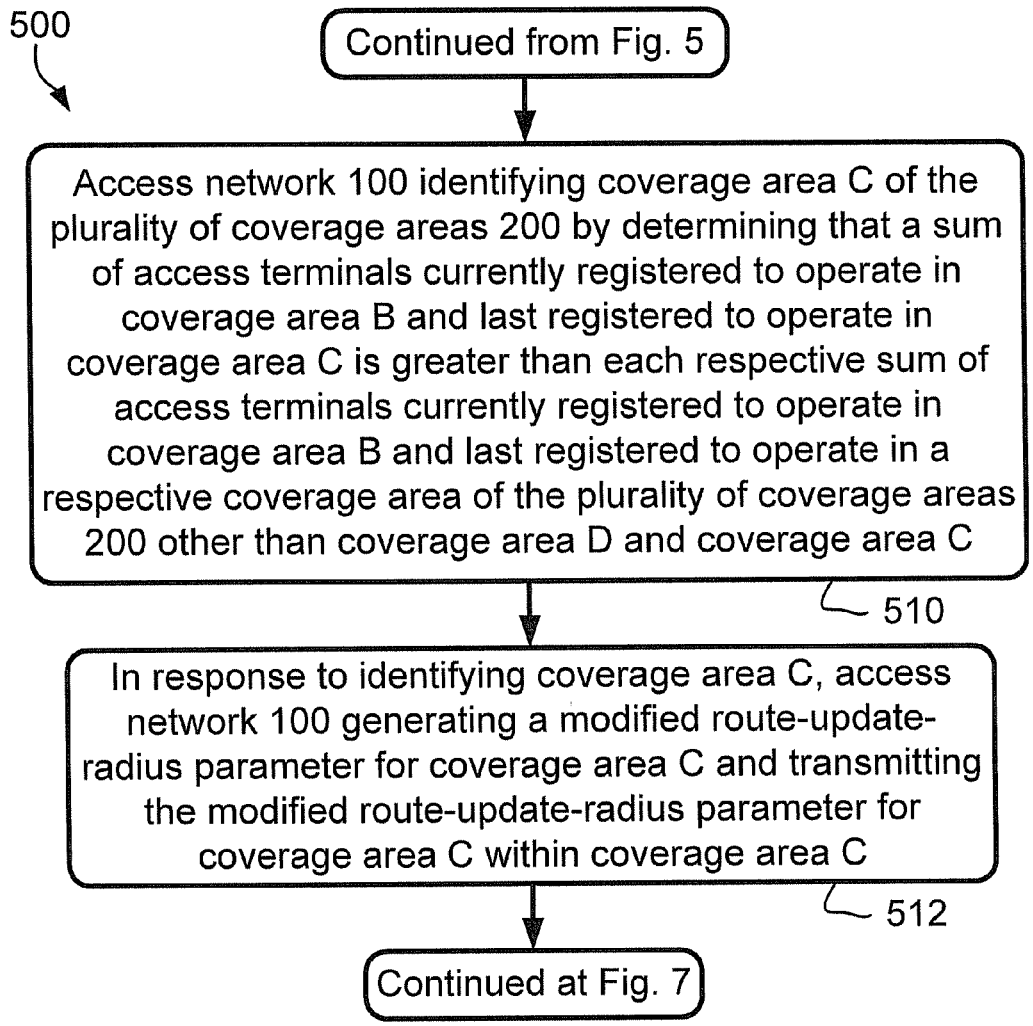
Figure 7:
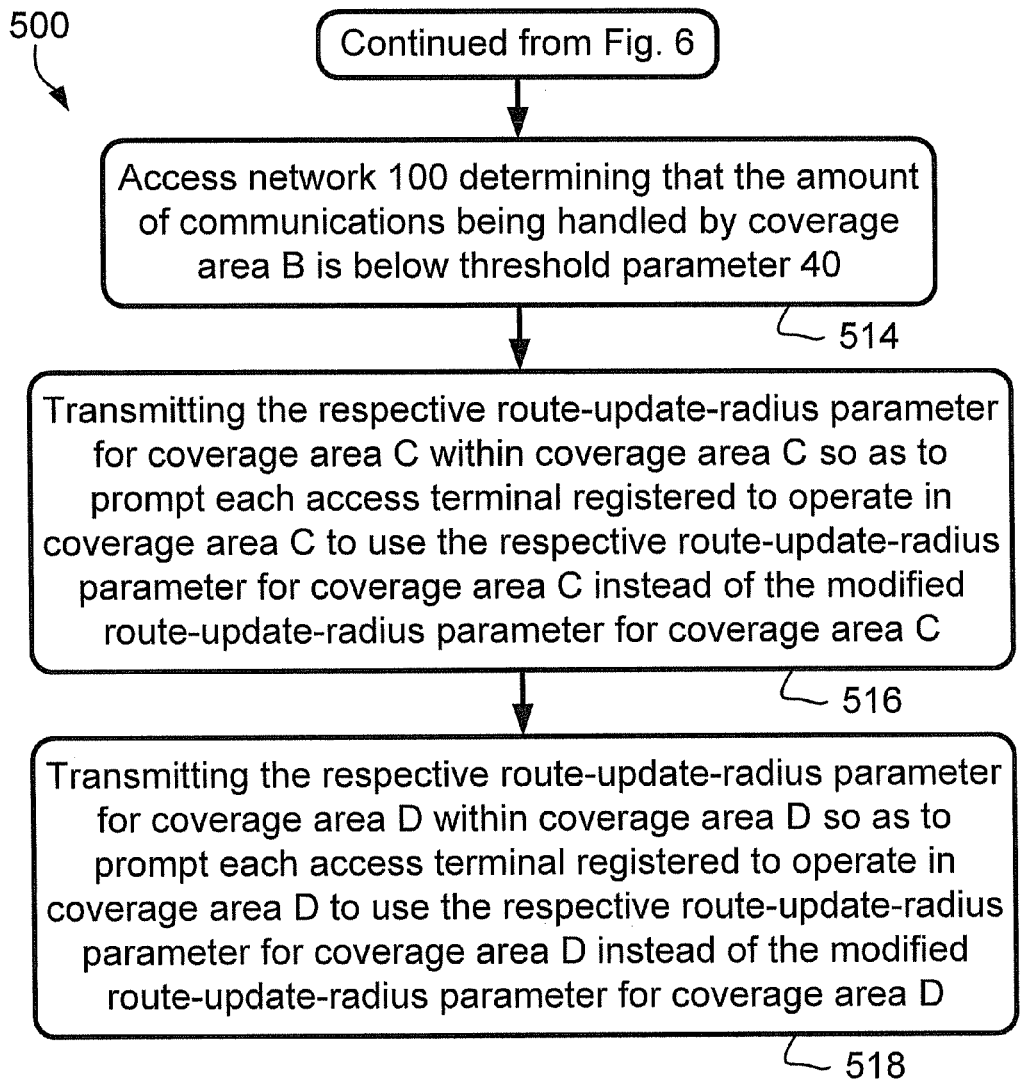

Next, FIG. 5, FIG. 6, and FIG. 7 illustrate a flow chart that illustrates a set of functions 500 that may be carried out in accordance with an example embodiment. Access network 100, the plurality of coverage areas 200, coverage area B, coverage area D, and coverage area C are used, respectively, to represent an access network, a plurality of coverage areas, a first coverage area, a second coverage area, and a third coverage area that may be used to carry out the set of functions 500. A person having ordinary skill in the art will understand that a combination of coverage areas other than coverage areas B, D, and C could be used to describe the set of functions 500.

The set of functions 500 refers to making various determinations. These determinations are described with respect to the example registration data shown in Table 1.

Referring to FIG. 5, block 502 includes access network 100 maintaining a respective route-update-radius parameter for each coverage area of the plurality of coverage areas 200. As an example, maintaining the route-update-radius parameters may include maintaining, for each of the coverage areas, any one or more of the following parameters: a route-update-radius, a modified route-update-radius, and a route-update-radius-offset. Maintaining the respective route-update-radius parameters at block 502 may include receiving instructions to store the parameters within computer-readable data storage device 30 and the subsequent storing of the parameters. The route-update-radius parameters 38 shown in FIG. 4 illustrate example route-update-radius parameters that may be maintained by access network 100 in accordance with block 502.

Next, block 504 includes access network 100 determining that coverage area B of the plurality of coverage areas 200 is handling an amount of communications at or above threshold parameter 40. The determining function of block 504 may include access network 100 determining that an occupancy rate of a channel defined for coverage area B is at or above threshold parameter 40. For example, the determining function of block 504 may include access network 100 monitoring an occupancy rate of a control channel, an access channel, or some other channel of coverage area B, comparing that monitored occupancy rate to threshold parameter 40, and determining that the monitored occupancy rate is at or above threshold parameter 40.

Alternatively, access network 100 may determine that coverage area B is handling an amount of communications at or above threshold parameter 40 (e.g., 90%) by determining that a vacancy rate of the monitored channel of coverage area B is less than another threshold parameter (e.g., 10%). The other threshold parameter may be determined by subtracting threshold parameter 40 from 100% (e.g., 100% minus 90% equals 10%). The other threshold may be maintained in data storage device 30 separate from threshold parameter 40.

Next, block 506 includes access network 100 identifying coverage area D of the plurality of coverage areas 200 by determining that a sum of access terminals currently registered to operate in coverage area B and last registered to operate in coverage area D is greater than each respective sum of access terminals currently registered to operate in coverage area B and last registered to operate in a respective coverage area of the plurality of coverage areas 200 other than coverage area D. Referring to Table 1, there are six access terminals currently registered with coverage area B, four of which were last registered with coverage area D and two of which were last registered with coverage area C. Thus, coverage area D was the last registered coverage area for the greatest number of access terminals currently registered to operate in coverage area B. By determining that coverage area B is handling more than a threshold amount of communications and then identifying coverage area D at block 504, access network 100 identifies a coverage area for which a modified route-update-radius parameter can be generated so as try to reduce the number of access terminals trying to register in the coverage area B.

Next, block 508 includes, in response to identifying coverage area D, access network 100 generating a modified route-update-radius parameter for coverage area D and transmitting the modified route-update-radius parameter for coverage area D within coverage area D. In accordance with an embodiment in which access network 100 maintains a route-update-radius and a modified route-update-radius or a route-update-radius offset (see FIG. 4), generating the modified route-route-update-radius parameter may include changing the value of the modified route-update-radius or the route-update-radius offset from its current value to a new value. In accordance with an embodiment in which access network 100 maintains a route-update-radius but does not maintain the modified route-update-radius or the route-update-radius offset for a coverage area, generating the modified route-route-update-radius parameter may include changing the value of the route-update-radius from its current value to a new value.

After generating the modified route-update-radius parameter, access network 100 may transmit the modified route-update-radius parameter to coverage area D via an overhead message broadcast over a control channel defined for coverage area D. After transmitting the modified route-update-radius parameter to coverage area D, access terminals registered to operate in coverage area D will begin using the modified route-update-radius parameter instead of the respective route-update-radius parameter for coverage area D that was previously transmitted to the access terminals registered to operate in coverage area D. Use of the modified route-update-radius parameter may cause the access terminals that received the parameter to register with a coverage area other than coverage area B or to postpone registering with coverage area B.

Turning to FIG. 6, additional functions of the set of functions 500 are shown. Block 510 includes access network 100 identifying coverage area C of the plurality of coverage areas 200 by determining that a sum of access terminals currently registered to operate in coverage area B and last registered to operate in coverage area C is greater than each respective sum of access terminals currently registered to operate in coverage area B and last registered to operate in a respective coverage area of the plurality of coverage areas 200 other than coverage area D and coverage area C. Referring to Table 1, there are six access terminals currently registered to coverage area B, four of which were last registered with coverage area D and two of which were last registered with coverage area C. Making the determination of block 510 identifies the coverage area for which another modified route-update-radius parameter can be generated so as try to further reduce the number of access terminals trying to register in a coverage area B.

Next, block 512 includes, in response to identifying coverage area C, access network 100 generating a modified route-update-radius parameter for coverage area C and transmitting the modified route-update-radius parameter for coverage area C within coverage area C. In accordance with an embodiment in which access network 100 maintains a route-update-radius and a modified route-update-radius or a route-update-radius offset (see FIG. 4), generating the modified route-route-update-radius parameter may include changing the value of the modified route-update-radius or the route-update-radius offset from its current value to a new value. In accordance with an embodiment in which access network 100 maintains a route-update-radius but does not maintain the modified route-update-radius or the route-update-radius offset for a coverage area, generating the modified route-route-update-radius parameter may include changing the value of the route-update-radius from its current value to a new value.

After generating the modified route-update-radius parameter for coverage area C, access network 100 may transmit the modified route-update-radius parameter to coverage area C via an overhead message broadcast over a control channel defined for coverage area C. After transmitting the modified route-update-radius parameter to coverage area C, access terminals registered to operate in coverage area C will begin using the modified route-update-radius parameter instead of the respective route-update-radius parameter for coverage area C that was previously transmitted to the access terminals registered to operate in coverage area C. Use of the modified route-update-radius parameter for coverage area C may cause the access terminals that received the parameter to register with a coverage area other than coverage area B or to postpone registering with coverage area B.

Turning to FIG. 7, additional functions of the set of functions 500 are shown. Block 514 includes access network 100 determining that the amount of communications being handled by coverage area B is below threshold parameter 40. The determining function of block 514 may include access network 100 determining that an occupancy rate of a channel defined for coverage area B is below threshold parameter 40. For example, the determining function of block 514 may include access network 100 monitoring the occupancy rate of a control channel, an access channel, or some other channel of coverage area B, comparing that monitored occupancy rate to threshold parameter 40, and determining that the monitored occupancy rate is below threshold parameter 40.

Alternatively, access network 100 may determine that coverage area B is handling an amount of communications below threshold parameter 40 (e.g., 90%) by determining that a vacancy rate of the channel of coverage area B is greater than another threshold parameter (e.g., 10%). The other threshold parameter may be determined by subtracting threshold parameter 40 from 100% (e.g., 100% minus 90% equals 10%).

Next, block 516 includes transmitting the respective route-update-radius parameter for coverage area C within coverage area C so as to prompt each access terminal registered to operate in coverage area C to use the respective route-update-radius parameter for coverage area C instead of the modified route-update-radius parameter for coverage area C. In accordance with an embodiment in which access network 100 maintains a route-update-radius and a modified route-update-radius or a route-update-radius offset (see FIG. 4), transmitting the respective route-update-radius parameter for coverage area C may include transmitting the route-update-radius (i.e., 10) within coverage area C. In accordance with an embodiment in which access network 100 maintains a route-update-radius but does not maintain the modified route-update-radius or the route-update-radius offset for coverage area C, transmitting the respective route-update-radius parameter for coverage area C may include changing the value of the route-update-radius from its current value to a previous value and then transmitting the route-update-radius within coverage area C.

Next, block 518 includes transmitting the respective route-update-radius parameter for coverage area D within coverage area D so as to prompt each access terminal registered to operate in coverage area D to use the respective route-update-radius parameter for coverage area D instead of the modified route-update-radius parameter for coverage area D. In accordance with an embodiment in which access network 100 maintains a route-update-radius and a modified route-update-radius or a route-update-radius offset (see FIG. 4), transmitting the respective route-update-radius parameter for coverage area D may include transmitting the route-update-radius (i.e., 7) within coverage area D. In accordance with an embodiment in which access network 100 maintains a route-update-radius but does not maintain the modified route-update-radius or the route-update-radius offset for coverage area D, transmitting the respective route-update-radius parameter for coverage area D may include changing the value of the route-update-radius from its current value to a previous value and then transmitting the route-update-radius within coverage area D.

In addition to the set of functions 500, further functions may be carried out with the example embodiments. For example, access network 100 may determine that multiple coverage areas are handling more than a threshold amount of communications and access network may responsively generate modified route-update-radius parameters for coverage areas remote (e.g., adjacent to the multiple coverage areas). Access network 100 may transmit these modified route-update-radius parameters within the remote coverage areas. Subsequently, access network 100 may determine that the multiple coverage areas are handling less that the threshold amount of communications and thereafter transmit default route-update-radius parameters within the remote coverage areas. Transmission of the default route-update-radius parameters may cause more access terminals to transfer to one of the coverage areas of the multiple coverage areas.

In the example embodiments in which access network 100 transmits a route-update-radius-offset within a coverage area, the access terminals registered to operate in that coverage area may add the route-update-radius-offset to the route-update-radius for the coverage area so as to determine the modified route-update-radius for the coverage area.

IV. Conclusion

Example embodiments of the present invention have been described above. Those skilled in the art will understand that changes and modifications may be made to the described embodiments without departing from the true scope and spirit of the present invention, which is defined by the claims.

We claim:
1. A method comprising:
an access network maintaining a respective route-update-radius parameter for each coverage area of a plurality of coverage areas defined by the access network;
the access network determining that a first coverage area of the plurality of coverage areas is handling an amount of communications at or above a threshold parameter;
the access network identifying a second coverage area of the plurality of coverage areas by determining that a sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area; and in response to identifying the second coverage area, the access network generating a modified route-update-radius parameter for the second coverage area and transmitting the modified route-update-radius parameter for the second coverage area within the second coverage area.

2. The method of claim 1,
wherein each coverage area of the plurality of coverage areas comprises a control channel,
wherein the method further comprises the access network monitoring an occupancy rate of the control channel of each coverage area of the plurality of coverage areas, and
wherein determining that the first coverage area is handling an amount of communications at or above the threshold parameter includes determining that the occupancy rate of the control channel of the first coverage area is at or above the threshold parameter.

3. The method of claim 1,
wherein each coverage area of the plurality of coverage areas comprises an access channel,
wherein the method further comprises the access network monitoring an occupancy rate of the access channel of each coverage area of the plurality of coverage areas, and
wherein determining that the first coverage area is handling an amount of communications at or above the threshold parameter includes determining that the occupancy rate of the access channel of the first coverage area is at or above the threshold parameter.

4. The method of claim 1, wherein generating the modified route-update-radius parameter for the second coverage area comprises modifying the respective route-update-radius parameter for the second coverage area.

5. The method of claim 1, further comprising:
the access network maintaining the modified route-update-radius parameter for the second coverage area instead of the respective route-update-radius parameter for the second coverage area.

6. The method of claim 1, wherein the modified route-update-radius parameter for the second coverage area is less than the respective route-update-radius parameter for the second coverage area.

7. The method of claim 1, wherein the modified route-update-radius parameter for the second coverage area is greater than the respective route-update-radius parameter for the second coverage area.

8. The method of claim 1, further comprising:
the access network maintaining data that identifies each access terminal currently registered to operate in a coverage area of the plurality of coverage areas, and
for each access terminal registered to operate in a coverage area of the plurality of coverage areas, the access network maintaining data that identifies a coverage area currently serving that access terminal and a last registered coverage area that served that access terminal,
wherein the access network refers to the data to determine that the sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area.

9. The method of claim 1, further comprising:
the access network determining that each coverage area of the plurality of coverage areas is handling an amount of communications below the threshold parameter; and
the accessing network reverting to use the respective route-update-radius parameter for the second coverage area instead of the modified route-update-radius parameter for the second coverage area.

10. The method of claim 1, further comprising:
the access network identifying a third coverage area of the plurality of coverage areas by determining that a sum of access terminals currently registered to operate in the first coverage area and last registered to operate in the third coverage area is greater than each respective sum of access terminals currently registered to operate in the first coverage area and last registered to operate in a respective coverage area of the plurality of coverage areas other than the second coverage area and the third coverage area; and
in response to identifying the third coverage area, the access network generating a modified route-update-radius parameter for the third coverage area and transmitting the modified route-update-radius parameter for the third coverage area within the third coverage area.

11. The method of claim 10, further comprising:
the access network determining that the amount of communications being handled by the first coverage area is below the threshold parameter; and
while the amount of communications being handled by the first coverage area is below the threshold parameter, the access network:
(i) transmitting the respective route-update-radius parameter for the third coverage area within the third coverage area so as to prompt each access terminal currently registered to operate in the third coverage area to use the respective route-update-radius parameter for the third coverage area instead of the modified route-update-radius parameter for the third coverage area, and
(ii) transmitting the respective route-update-radius parameter for the second coverage area within the second coverage area so as to prompt each access terminal currently registered to operate in the second coverage area to use the respective route-update-radius parameter for the second coverage area instead of the modified route-update-radius parameter for the second coverage area.

12. A system of a radio access network that defines a plurality of coverage areas, the system comprising:
a computer-readable data storage device that contains computer-readable program instructions and a respective route-update-radius parameter for each coverage area of the plurality of coverage areas defined by the radio access network;
a processor; and
a plurality of base transceiver stations, wherein each base transceiver station is operable to transmit and receive communications within at least one coverage area of the plurality of coverage areas,
wherein the computer-readable program instructions comprise instructions that are executable by the processor to (i) determine that a first coverage area of the plurality of coverage areas is handling an amount of communications at or above a threshold parameter, (ii) identify a second coverage area of the plurality of coverage areas via a determination that a sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area, and (iii) generate a modified route-update-radius parameter for the second coverage area, and wherein a base transceiver station of the plurality of base transceiver stations transmits the modified route-update-radius parameter for the second coverage area within the second coverage area.

13. The system of claim 12, further comprising:

a radio network controller that controls the plurality of base transceiver stations, wherein the processor and the computer-readable data storage device are co-located with the radio network controller.

14. The system of claim 12, wherein the first coverage area and the second coverage area are formed by a common base transceiver station.

15. The system of claim 12, wherein the first coverage area is formed by a first base transceiver station, and wherein the second coverage area is formed by a second base transceiver station.

16. The system of claim 15, wherein the first coverage area is a sector of a plurality of sectors formed by the first base transceiver station, and wherein the second coverage area is a sector of a plurality of sectors formed by the second base transceiver station.

17. The system of claim 15, wherein the first coverage area comprises a cell formed by the first base transceiver station, and wherein the second coverage area is a sector of a plurality of sectors formed by the second base transceiver station.

18. The system of claim 15, wherein the first coverage area comprises a cell formed by the first base transceiver station, and wherein the second coverage area comprises a cell formed by the second base transceiver station.

19. A radio network controller of a radio access network that defines a plurality of coverage areas, the radio network controller comprising:

a processor;

a computer-readable data storage device that contains computer-readable program instructions and a respective route-update-radius parameter for each coverage area of the plurality of coverage areas defined by the radio access network;

an interface that communicatively couples the radio network controller to one or more base transceiver stations, wherein each base transceiver station is operable to transmit and receive communications within at least one coverage area of the plurality of coverage areas, wherein the computer-readable program instructions comprise instructions that are executable by the processor to (i) determine that a first coverage area of the plurality of coverage areas is handling an amount of communications at or above a threshold parameter, (ii) identify a second coverage area of the plurality of coverage areas via a determination that a sum of access terminals currently registered to operate in the first coverage area and last registered to operate in the second coverage area is greater than each respective sum of access terminals currently registered to operate in the first coverage area and last registered to operate in a respective coverage area of the plurality of coverage areas other than the second coverage area, (iii) generate a modified route-update-radius parameter for the second coverage area, and (iv) cause the modified route-update-radius parameter for the second coverage area to be transmitted via the communications interface to a base transceiver station within the second coverage area.

\* \* \* \* \*